Patented July 31, 1951

2,562,409

UNITED STATES PATENT OFFICE 2,562,409

SUBSTITUTED PHENYL-PENICILLINS

Otto K. Behrens, Reuben G. Jones, and Quentin F. Soper, Indianapolis, Ind., and Joseph W. Corse, Lafayette, Calif., assignors to Eli Lilly and Company, Indianapolis, Ind., a corporation of Indiana No Drawing. Application May 3, 1949, Serial No. 91,213

8 Claims. (Cl. 260—239.1)

This invention relates to antibiotic compounds and is directed to novel substituted phenyl penicillins. This application is a continuation-in-part of our copending prior applications Serial No. 653,137, filed March 8, 1946, now Patent No. 2,479,296, and Serial No. 773,489, filed September 11, 1947, now abandoned.

There are certain known penicillins comprising a group of chemically related compounds which, under suitable conditions of growth, are produced as metabolic products by a penicillin-producing mold. The complete molecular structures of these compounds had not been definitely established when said prior applications were filed but sufficient elucidation of structure had been accomplished to allow the assignment to them of the following empirical formula

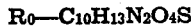

wherein $R_0$ represents an organic radical which is characteristic of each individual penicillin.

These known penicillins comprise a group of penicillins of the foregoing formula including those wherein the $R_0$ radical represents a butene-1-yl, n-butyl, n-hexyl, phenyl or a p-hydroxyphenyl radical. It is known, furthermore, that in the normal fermentative production these known penicillins formed in admixture.

The known penicillins thus identified, in view of further elucidation of the $C_{10}H_{13}N_2O_4S$ portion thereof, may be represented by the following formula

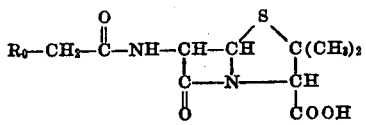

in which $R_0$ has the same meaning as set forth above.

We have made the surprising discovery that a penicillin-producing mold may be induced to produce a novel penicillin, by incorporating in the nutrient medium wherein the mold is grown, a selected organic compound, called herein a precursor compound. Such selected precursor compound, although foreign to the normal metabolic requirements of the mold, may be metabolized and incorporated in substantial part in the molecule of a novel penicillin. This result is especially surprising in view of the recognized specificity of the enzyme systems whereby lower organisms maintain growth and development. It is further surprising that use of a selected precursor compound may lead to the production of a novel penicillin to the substantial exclusion of the known and normally-produced penicillins.

The present invention contemplates novel products of fermentative processes which comprise growing a penicillin-producing mold in association with a culture medium containing nutrient material and a selected precursor compound, said product as produced consisting essentially of a penicillin represented by the formula

wherein R is a monosubstituted-phenyl radical of the group consisting of halophenyl, nitrophenyl, cyanophenyl, and lower-aliphaticphenyl in which the aliphatic substituent contains from 1 to 3 carbon atoms.

Of these, we deem the para- and meta-substituted phenyl radicals preferable. The para-substituted phenyl radicals, as a group, may be produced in relatively high potency yield, and we consider such group especially desirable. For example, in comparable production tests, the potency yield of p-bromophenyl penicillin was nearly three times that of penicillin G. Of the meta-substituted phenyl radicals, the m-halophenyl radicals all show a potency yield at least nearly twice that of penicillin G, and we consider that m-halophenyl group to be especially desirable.

The novel penicillins are ordinarily produced in the form of a salt, for example the sodium salt of the penicillin acid. The salt may be either the salt originally produced or a different salt to which the original product is transformed, and preferably is one of the salts ordinarily employed in the administration of the known penicillins, such as the common metal salts, for example, the sodium salt, the potassium salt, the ammonium salt, and calcium salt, etc.

According to the present knowledge of the structure of penicillin, the products of this application, as defined above, including both acids and salts thereof, may be represented by the following structural formula

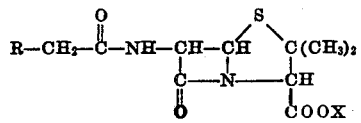

in which R has the same significance as before and in which X represents hydrogen when the penicillin is in acid form and represents a salt-forming radical when the penicillin is in salt form, such salt-forming radicals including those customarily employed in penicillin production and therapy, such as potassium, sodium, calcium, ammonium, etc.

For convenience, we use below the empirical formula, e. g. $C_{10}H_{13}N_2O_4S$, as representing the molecular portion of the penicillin to which the substituted phenyl radical is attached.

The new penicillins may be named by reference to the particular substituted phenyl radical contained therein. Thus, for example, the penicillin wherein the substituted phenyl radical is the o-bromophenyl radical, is named o-bromophenyl-penicillin; and a penicillin wherein the substituted phenyl radical is the p-ethylphenyl radical, is named p-ethylphenyl-penicillin.

Broadly speaking, a method of producing a novel penicillin in accordance with this invention is as follows: There is provided a nutrient medium suitable for the growth of a penicillin-producing mold. To the nutrient medium is added in effective amount a precursor compound comprising an R-monosubstituted acetic acid or its equivalent. Precursor compounds useful for this purpose comprise monosubstituted acetic acids represented by the formula $$R-CH_2-COOH$$

wherein R has the same meaning as before. In place of the monosubstituted acetic acids, there may be used equivalents of such acids, said equivalents comprising those compounds readily converted by the mold to the monosubstituted acetic acids. Such equivalents include simple derivatives of the acids such as their salts, esters, amides, and anhydrides, and may include other compounds, which the mold may convert to the monosubstituted acetic acids, such as ω-R-substituted, saturated straight-chain alcohols, amines, aldehydes, and acids containing an even number of carbon atoms, and the simple derivatives thereof.

The culture medium composition comprising nutrient material and precursor compound is inoculated with a penicillin-producing mold and the mold is grown under penicillin-producing conditions, during which growth a new penicillin is produced by the mold as a metabolic product. After mold growth, the mold mycelium is separated from the culture medium, and from the latter the novel penicillin is separated.

The isolation of the new penicillin may be effected by methods known to the art, such as absorption and extraction, to obtain a product sufficiently pure for practical purposes. If a purer product is desired, the new penicillin may be subjected to additional methods of purification such as partition chromatography and elution, and recrystallization.

The novel penicillin desirably is recovered in the form of one of its salts, for example the sodium or potassium salt. Identification of the novel penicillin may be confirmed by methods known to the art, such methods comprising analysis, spectroscopic absorption, X-ray diffraction and antibacterial tests.

The nutrient material used in the composition wherein the mold is grown may comprise ingredients such as water, sugars, inorganic salts and desirably one or more indeterminate compositions such as corn steep amino acids and bran. Numerous suitable nutrient media comprising materials of the type mentioned are known to the art.

During the growth of the mold the culture medium comprising nutrient material and precursor compound is maintained at a suitable temperature, for example, in the range of 20–30° C. The range of temperature which has been found to be particularly suitable is from 24–26° C. The period of time during which the mold is grown will depend upon the objective desired. Thus the mold may be grown only during the period of its maximum rate of growth before mold growth is interrupted preliminary to isolating the new penicillin. Such a period generally is from 2 to 3 days. On the other hand, the mold may be grown for a longer period of time to obtain the maximum yield of new penicillin. In such a case, mold growth is usually continued for about 4 to 5 days.

The mold may be grown under various conditions. For example, the mold may be grown without agitation of the culture medium, in which case the mold grows on the surface of the medium. Alternatively, the culture medium may be agitated by shaking or stirring during the growth of the mold in which case the mold is dispersed throughout the culture medium and grows while so dispersed.

The molds suitable for the purposes of this invention are mold organisms of the type capable of producing penicillins. Such organisms include molds of the *Penicillium notatum-chrysogenum* group as well as certain molds of the Aspergillus group. It is to be understood that not all mold strains are equally efficient for the purposes of this invention. By way of example, mold strains suitable for the purposes of this invention are those known as strains X1612 and Q176 of the *Penicillium notatum-chrysogenum* group and strain G147 of the *Aspergillus flavus* group.

The concentration of the precursor compounds employed in the culture medium may vary over a substantial range. The precursor compounds may be present in the culture medium in concentrations of the order of about 1 percent, but it is usually desirable that smaller concentrations be employed since there is no particular advantage to be gained in employing concentrations in substantial excess of those necessary to produce the optimum effect. It appears at present that the optimum concentration of the monosubstituted acetic acids and derivatives thereof lies in the range of about 0.01 to about 0.05 percent on a weight-volume basis when mold strain X1612 is used, and that this optimum concentration may range upwardly when mold strain Q–176 is used.

The precursor compound may be associated with the mold and culture medium at any suitable time. Thus the materials of the nutrient medium may be inoculated with the mold and the precursor compound to be employed may be incorporated either before or after inoculation of the culture medium with the mold.

The following specific examples further illustrate the invention:

*Example 1*

The sodium salt of p-chlorophenyl-penicillin represented by the formula

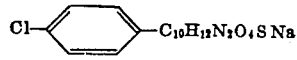

can be prepared in the following manner:

A culture medium is prepared in the following proportions:

| | | |
|---|---|---|
| Lactose | g | 125 |
| Corn steep solids | g | 100 |
| Calcium carbonate | g | 10 |
| N-p-chlorophenylacetylvaline | g | 1.1 |
| Water | cc | 5000 |

The culture medium is distributed in 200 cc. portions in 1 liter Erlenmeyer flasks, sterilized, inoculated with a spore suspension of Penicillium mold, strain N. R. R. L. 1976, and stoppered with cotton plugs. The flasks are maintained at a temperature of about 23–26° C. and shaken constantly for five days. The flask contents are then filtered to remove the mold mycelium, the filtrate cooled to about 0° C., acidified to about pH 2.2 with orthophosphoric acid and shaken with an equal volume of amyl acetate. The amyl acetate layer is separated and extracted with three 100 cc. portions of cold water to which cold N/10 sodium bicarbonate solution is added during the course of each extraction until a pH of about 7.1 to 7.3 is attained in the aqueous phase. The aqueous extracts are combined, cooled to about 0° C., acidified to about pH 2.2 with orthophosphoric acid and extracted with three 100 cc. portions of ether. The ether extracts are combined, and are passed through a chromatographic type silica adsorption column about 30 mm. in diameter and 300 mm. long, and containing a pH 6.2 phosphate buffer. The silica column is developed by percolation with six 100 cc. portions of ether containing successively increasing amounts of methanol in the order of ½, 1, 1½, 2, 2½, and 3 percent.

The developed silica column is divided into about 12 equal sections and each section is eluted with three 30 cc. portions of M/15 phosphate buffer of pH 7.0. The eluates are assayed bacteriologically to determine their penicillin content. About 92 percent of the total antibiotic activity possessed by all the eluates originates in a single band in the silica column and results from the presence of p-chlorophenyl-penicillin. This band occupies a position similar to that in which penicillin X is found in comparable columns. The eluates obtained from the silica gel sections which make up this uniform band are combined, cooled to about 0° C., acidified to about pH 2.2 and extracted with three 50 cc. portions of chloroform. The combined chloroform extracts are then passed through a silica adsorption column containing a pH 6.2 phosphate buffer. This silica gel column is developed by percolation with three 100 cc. portions of chloroform containing successively increasing amounts of methanol in the order of 1, 2 and 3 percent. The developed silica column is then divided into 12 equal sections and each section is eluted with three 30 cc. portions of M/15 phosphate buffer of pH 7.0. Bacteriological assay of the eluates shows that about 97 percent of the total antibiotic activity originates in a single band in the silica column. The eluates obtained by extraction of the silica column sections which comprise this band are combined, cooled to about 0° C., acidified to about pH 2.2 and extracted with three 100 cc. portions of ether. The ether extracts are combined and extracted with about 75 cc. of a cool dilute aqueous solution of sodium hydroxide to which N/10 sodium hydroxide solution is added during the course of the extraction so that a final pH of about 7.0 is obtained in the aqueous phase. From this aqueous solution the sodium salt of p-chlorophenyl-penicillin may be separated by any suitable means, for example by freezing and evaporation in vacuo from the frozen state.

The resulting dry sodium salt of p-chlorophenyl-penicillin is washed with several portions of anhydrous acetone. It is crystallized by dissolving it in 2 cc. of 90 percent aqueous acetone followed by the addition of 4 cc. of anhydrous acetone. The salt is recrystallized by dissolving it in 2 cc. of 90 percent aqueous acetone and subsequently adding 2 cc. of anhydrous acetone.

The sodium salt of p-chlorophenyl-penicillin prepared according to the above procedure assayed about 2400 Oxford units per mg. when tested against *Staph. aureus*, strain 209P. A differential assay carried out on *Staph. aureus*, strain 209P, and *B. subtilis*, strain N. R. R. L. B–558, gave a value of about 0.73. The optical rotation was found to be $[\alpha]_D^{30°} = +260°$ as a 0.3 percent solution in water. Analysis showed the presence of 49.08 percent carbon, 3.84 percent hydrogen, 7.30 percent nitrogen and 8.85 percent chlorine as compared with the calculated values of 49.17 percent carbon, 4.12 percent hydrogen, 7.17 percent nitrogen and 9.07 percent chlorine.

*Example 2*

The sodium salt of p-chlorophenyl-penicillin can also be prepared in the following manner:

A culture medium is prepared in the following proportions:

| | | |
|---|---|---|
| Lactose | g | 125 |
| Corn steep solids | g | 150 |
| Calcium carbonate | g | 25 |
| p-Chlorophenylacetic acid | g | 0.67 |
| Water | cc | 5000 |

The culture medium is distributed in 200 cc. portions in 1 liter Erlenmeyer flasks, sterilized, inoculated with a spore suspension of Penicillium mold, strain X1612, and stoppered with cotton plugs. The growth of the organism and the isolation and purification of the p-chlorophenyl-penicillin is carried out according to the procedure described in Example 1. The sodium salt of p-chlorophenyl-penicillin thus obtained is identical with p-chlorophenyl-penicillin sodium salt obtained by the procedure described in Example 1.

*Example 3*

The sodium salt of p-methylphenyl-penicillin represented by the formula

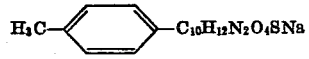

can be prepared in the following manner:

A culture medium is prepared in the following proportions:

| | | |
|---|---|---|
| Lactose | g | 125 |
| Corn steep solids | g | 100 |
| Calcium carbonate | g | 10 |
| N - (2 - hydroxyethyl) - p - methylphenyl-acetamide | g | 0.82 |
| Water | cc | 5000 |

The culture medium is placed in a 5 gallon bottle equipped with a stirrer and an air inlet tube fitted with an air filter. The culture medium is sterilized and inoculated with a spore suspension of Penicillium mold, strain X1612. The bottle contents are maintained at a temperature of about 23–26° C. and are continuously stirred for five days. Throughout this time, air is continuously passed through the air inlet tube. The mold mycelium is then removed from the aqueous culture medium by filtration and the culture medium is cooled to about 0° C., acidified to about pH 2.2 with orthophosphoric acid and extracted with an equal volume of amyl acetate. The amyl acetate layer is separated and extracted with three 100 cc. portions of cold water to which cold N/10 sodium bicarbonate solution is added during the course of each extraction until a pH of about 7.1 to 7.3 is attained in the aqueous phase. The aqueous extracts are combined, cooled to about 0° C., acidified to about pH 2.2 with orthophosphoric acid and extracted with three 100 cc. portions of ether. The ether extracts are combined and passed through a chromatographic type silica adsorption column about 30 mm. in diameter and about 300 mm. long and which contains a pH 6.2 phosphate buffer. The silica column is developed by percolation with six 100 cc. portions of ether containing successively increasing amounts of methanol in the order of ½, 1, 1½, 2, 2½, and 3 percent.

The developed silica column is divided into about 12 equal sections and each section is eluted with three 30 cc. portions of M/15 phosphate buffer of pH 7.0. The eluates are assayed bacteriologically to determine their penicillin content. 100 percent of the total antibiotic activity possessed by all the eluates originates in a single band in the silica column and results from the presence of p-methylphenyl-penicillin. The eluates obtained from the silica gel sections which make up this uniform band are combined, cooled to about 0° C., acidified to about pH 2.2 with orthophosphoric acid and extracted with three 50 cc. portions of chloroform. The combined chloroform extracts are passed through a silica adsorption column containing a pH 6.2 phosphate buffer. The silica gel column is developed by percolation with three 100 cc. portions of chloroform containing successively increasing amounts of methanol in the order of 1, 2 and 3 percent. The developed silica column is then divided into 12 equal sections and each section is eluted with three 30 cc. portions of M/15 phosphate buffer of pH 7.0. Bacteriological assay of the eluates shows that almost 100 percent of the total antibiotic activity originates in a single band in the silica column. The eluates obtained by extraction of the silica column sections which comprise this band are combined, cooled to about 0° C., acidified to about pH 2.2 with orthophosphoric acid and extracted with three 100 cc. portions of ether. The ether extracts are combined and extracted with about 75 cc. of a cold dilute aqueous solution of sodium hydroxide to which N/10 sodium hydroxide solution is added during the course of the extraction so that a final pH of about 7.0 is obtained in the aqueous phase. From this aqueous solution the sodium salt of p-methylphenyl-penicillin may be separated by any suitable means, for example by freezing and evaporation in vacuo from the frozen state.

The resulting amorphous, dry sodium salt of p-methylphenyl-penicillin is treated with 2 cc. of absolute acetone in which it almost completely dissolves but from which it rapidly crystallizes. The mixture is allowed to stand two hours, is centrifuged, washed with several portions of absolute acetone and then dissolved in 2 cc. of 90 percent aqueous acetone and precipitated by the addition of 4 cc. of absolute acetone. The salt is recrystallized by dissolving it in about 2.6 cc. of 87 percent aqueous acetone followed by the addition of 5.7 cc. of absolute acetone.

The sodium salt of p-methylphenyl-penicillin prepared according to the above procedure assayed about 2285 Oxford units per milligram when tested against Staph. aureus, strain 209P. A differential assay carried out on Staph. aureus, strain 209P, and B. subtilis, strain N. R. R. L. B–558, gave a value of about 0.73. Analysis showed the presence of 55.12 percent carbon, 5.43 percent hydrogen, 7.49 percent nitrogen and 8.56 percent sulfur as compared with the calculated values of 55.12 percent carbon, 5.17 percent hydrogen, 7.56 percent nitrogen and 8.66 percent sulfur.

Example 4

The sodium salt of p-methylphenyl-penicillin can also be prepared in the following manner:

A culture medium is prepared as shown in Example 3 except that in place of the 0.82 g. of N-(2 - hydroxyethyl) - p - methylphenylacetamide there is employed 2.5 g. of p-methylphenethylamine. The sterile culture medium is placed in a 5 gallon bottle inoculated with a spore suspension of Penicillium mold, strain X1612. The growth of the mold and the isolation and purification of p-methylphenyl-penicillin are carried out according to the procedure described in Example 3.

The sodium salt of p-methylphenyl-penicillin thus obtained is identical with that obtained by the procedure described in Example 3.

Example 5

The sodium salt of p-nitrophenyl-penicillin represented by the formula

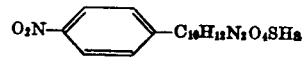

can be prepared in the following manner:

A culture medium is prepared in the following proportions:

| | |
|---|---|
| Lactose _____ g__ | 125 |
| Corn steep solids _____ g__ | 100 |
| Calcium carbonate _____ g__ | 10 |
| N-p-nitrophenylacetylvaline _____ g__ | 1.05 |
| Water _____ cc__ | 2000 |

The culture medium is distributed in 200 cc. portions in 1 liter Erlenmeyer flasks, sterilized, inoculated with a spore suspension of Penicillium mold, strain N. R. R. L. 1976, and stoppered with cotton plugs. The flasks are maintained at a temperature of about 23–26° C. and shaken constantly for five days. The flask contents are then filtered to remove the mold mycelium, the filtrate cooled to about 0° C., acidified to about pH 2.2 with orthophosphoric acid and extracted with about 60 per cent of its volume of amyl acetate. The amyl acetate layer is separated and extracted with three 100 cc. portions of cold water to which cold N/10 sodium bicarbonate solution is added during the course of each extraction until a pH of about 7.1 to 7.3 is attained in the aqueous phase. The aqueous extracts are combined, cooled to about 0° C., acidified to about pH 2.2 with orthophosphoric acid and extracted with three 100 cc. portions of ether. The ether extracts are combined, and are passed through a chromatographic type silica adsorption column about 35 mm. in diameter and 300 mm. long and which contains a pH 6.2 phosphate buffer. The silica column is developed by percolation with six 100 cc. portions of ether containing successively increasing amounts of methanol in the order of ½, 1, 1½, 2, 2½, and 3 percent.

The developed silica column is divided into about 12 equal sections and each section is eluted with three 30 cc. portions of M/15 phosphate buffer of pH 7.0. The eluates are assayed bacteriologically to determine their penicillin content. About 38 percent of the total antibiotic activity possessed by all the eluates originates in a single band in the silica column and results from the presence of p-nitrophenyl-penicillin. This band occupies a position just above that in which penicillin F is found in comparable columns. The eluates obtained from the silica gel sections which make up this uniform band are combined, cooled to about 0° C., acidified to about pH 2.2 with orthophosphoric acid and extracted with three 50 cc. portions of chloroform. The combined chloroform extracts are passed through a silica adsorption column containing a pH 6.2 phosphate buffer.

This silica gel column is developed by percolation with three 100 cc. portions of chloroform containing successively increasing amounts of methanol in the order of 1, 2 and 3 percent. The developed silica column is then divided into 12 equal sections and each section is eluted with three 30 cc. portions of M/15 phosphate buffer of pH 7.0. Bacteriological assay of the eluates shows that 100 percent of the total antibiotic activity originates in a single band in the silica column. The eluates obtained by extraction of the silica column sections which comprise this band are combined, cooled to about 0° C., acidified to about pH 2.2 and extracted with three 100 cc. portions of ether. The ether extracts are combined and extracted with about 75 cc. of cold water to which N/10 sodium bicarbonate solution is added during the course of the extraction so that a final pH of about 7.0 is obtained in the aqueous phase. From this aqueous solution the sodium salt of p-nitrophenyl-penicillin may be separated by any suitable means, for example, by freezing and evaporation in vacuo from the frozen state.

The dry amorphous sodium salt of p-nitrophenyl-penicillin is treated with 2 cc. of absolute acetone in which it almost completely dissolves, but from which it precipitates in crystalline form upon standing about two hours. The mixture is centrifuged and the solid washed with several portions of absolute acetone. The salt is redissolved in 1.6 cc. of 90 percent aqueous acetone and reprecipitated by the addition of 6 cc. of absolute acetone. A further recrystallization is effected by solution of the salt in 0.3 cc. of 90 percent acetone followed by the addition of a total of 3 cc. of absolute acetone added in portions over a period of about four hours.

The sodium salt of p-nitrophenyl-penicillin prepared according to the above procedure assayed about 1640 Oxford units per milligram when tested against *Staph. aureus*, strain 209P. A differential assay carried out on *Staph. aureus*, strain 209P, and *B. subtilis*, strain N. R. R. L. B–558, gave a value of about 0.84. The ultraviolet absorption spectrum showed a characteristic peak at about 270 millimicrons indicative of the presence of the p-nitrophenyl group.

*Example 6*

The sodium salt of p-nitrophenyl-penicillin can also be prepared in the following manner:

A culture medium is prepared as shown in Example 5 except that in place of the 1.05 g. of N-p-nitrophenyl-acetylvaline there is employed 1.05 g. of N-p-nitrophenylacetylisoleucine. The culture medium may then be treated substantially according to the procedure described in Example 5, and the penicillin produced in the culture medium may be isolated by the procedure substantially as described in Example 5.

The sodium salt of p-nitrophenyl-penicillin thus prepared is identical to p-nitrophenyl-penicillin sodium salt according to the procedure described in Example 5.

*Example 7*

The sodium salt of p-fluorophenyl-penicillin represented by the formula

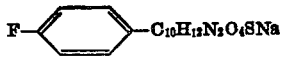

can be prepared in the following manner:

A culture medium is prepared in the following proportions:

| | |
|---|---|
| Lactose _____g__ | 125 |
| Corn steep solids _____g__ | 100 |
| Calcium carbonate _____g__ | 10 |
| N-(2-hydroxyethyl)-p-fluorophenyl-acetamide _____g__ | 0.72 |
| Water _____cc__ | 5000 |

The culture medium is distributed in 200 cc. portions in 1 liter Erlenmeyer flasks, sterilized, inoculated with a spore suspension of Penicillium mold, strain N. R. R. L. 1976, and stoppered with cotton plugs. The flasks are maintained at a temperature of about 23–26° C. and shaken constantly for five days. The flask contents are then filtered to remove the mold mycelium, the filtrate cooled to about 0° C., acidified to about pH 2.2 with orthophosphoric acid and extracted with an equal volume of amyl acetate. The amyl acetate layer is separated and extracted with three 100 cc. portions of cold water to which cold N/10 sodium bicarbonate solution is added during the course of each extraction until a pH of about 7.1 to 7.3 is attained in the aqueous phase. The aqueous extracts are combined, cooled to about 0° C., acidified to about pH 2.2 with orthophosphoric acid and extracted with three 100 cc. portions of ether. The ether extracts are combined, and are passed through a chromatographic type silica adsorption column about 30 mm. in diameter and 300 mm. long and containing a pH 6.2 phosphate buffer. The silica column is developed by percolation with six 100 cc. portions of ether containing successively increasing amounts of methanol in the order of ½, 1, 1½, 2, 2½ and 3 percent.

The developed silica column is divided into about 12 equal sections and each section is eluted with three 30 cc. portions of M/15 phosphate buffer of pH 7.0. The eluates are assayed bacteriologically to determine their penicillin content. Practically all of the total antibiotic activity possessed by all the eluates originates in a single band in the silica column and arises from the presence of p-fluorophenyl-penicillin. The eluates obtained from the silica gel sections which make up this uniform band are combined, cooled to about 0° C., acidified to about pH 2.2 with orthophosphoric acid and extracted with three 50 cc. portions of chloroform. The combined chloroform extracts are passed through a silica adsorption column containing a pH 6.2 phosphate buffer. This silica gel column is developed by percolation with three 100 cc. portions of chloroform containing successively increasing amounts of methanol in the order of 1, 2, and 3 percent. The developed silica column is then divided into 12 equal sections and each section is eluted with three 30 cc. portions of M/15 phosphate buffer of pH 7.0. Bacteriological assay of the eluates shows that almost 100 per cent of the total antibiotic activity originates in a single band in the silica column. The eluates obtained by extraction of the silica column sections which comprise this band are combined, cooled to about pH 2.2 with orthophosphoric acid and extracted with three 100 cc. portions of ether. The ether extracts are combined and extracted with 75 cc. of a cold dilute aqueous solution of sodium hydroxide to which N/10 sodium hydroxide solution is added during the course of the extraction so that a final pH of about 7.0 is obtained in the aqueous phase. From this aqueous solution the sodium salt of p-fluorophenyl-penicillin may be separated by any suitable means, for example by freezing and evaporation in vacuo from the frozen state.

The resulting dry sodium salt of p-fluorophenyl-penicillin is washed with several portions of anhydrous acetone. It may be crystallized by dissolving it in 0.4 cc. of 90 percent aqueous acetone followed by the addition of 1.5 cc. of anhydrous acetone.

The sodium salt of p-fluorophenyl-penicillin assayed about 1770 Oxford units per mg. when tested against *Staph. aureus*, strain 209P. A differential assay when carried out on *Staph. aureus*, strain 209P, and *B. subtilis*, strain N. R. R. L. B–558, gave a value of about 0.89. Analysis of a sample of p-fluorophenyl-penicillin showed the presence of 51.27 percent carbon, 4.15 percent hydrogen, 7.49 percent nitrogen and 8.43 percent sulfur as compared with the calculated values of 51.33 percent carbon, 4.31 percent hydrogen, 7.47 percent nitrogen and 8.56 percent sulfur.

Example 8

The sodium salt of p-fluorophenyl-penicillin can also be prepared in the following manner:

A culture medium may be prepared in the following proportions:

| | | |
|---|---|---|
| Lactose | g | 125 |
| Corn steep solids | g | 150 |
| Calcium carbonate | g | 25 |
| p-Fluorophenethylamine | g | 2.0 |
| Water | cc | 5000 |

The sterile culture medium is placed in a 5 gallon bottle equipped with a stirrer and an air inlet tube fitted with an air filter. The culture medium is inoculated with a spore suspension of Penicillium mold, strain X1612. The bottle contents are maintained at a temperature of about 23–26° C., and are stirred continuously for five days. Throughout this time air is continuously passed through the air inlet tube. The mold mycelium is then removed from the aqueous culture medium by filtration. The desired p-fluorophenyl-penicillin may be isolated and purified by substantially the same procedure as described in Example 7.

The sodium salt of p-fluorophenyl-penicillin thus prepared is identical with p-fluorophenyl-penicillin sodium salt prepared according to the procedure described in Example 7.

Example 9

The sodium salt of o-fluorophenyl-penicillin represented by the formula

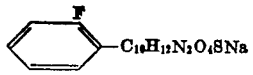

can be prepared in the following manner:
A culture medium may be prepared in the following proportions:

| | | |
|---|---|---|
| Lactose | g | 125 |
| Corn steep solids | g | 100 |
| Calcium carbonate | g | 10 |
| N-(2-hydroxyethyl)-o-fluorophenylacetamide | g | 0.78 |
| Water | cc | 5000 |

The sterile culture medium is inoculated with mold spores and subsequent mold growth and isolation of o-fluorophenyl-penicillin is effected by substantially the same procedure as described in Example 7.

The dry amorphous sodium salt of o-fluorophenyl-penicillin is recrystallized by solution in 1½ cc. of 90 percent aqueous acetone followed by the addition of 2½ cc. of absolute acetone which is added slowly and with shaking. Recrystallization may be effected by dissolving the penicillin in 90 percent aqueous acetone and precipitation with absolute acetone.

A sample of the sodium salt of o-fluorophenyl-penicillin was found to possess a value of about 1340 Oxford units per milligram when tested against *Staph. aureus*, strain 209P. A differential assay carried out on *Staph. aureus*, strain 209P, and *B. subtilis*, strain N. R. R. L. B–558, gave a value of about 1.1. Analysis showed the presence of 51.93 percent carbon, 4.59 percent hydrogen, 7.81 percent nitrogen and 8.09 percent sulfur as compared with the calculated values of 51.33 percent carbon, 4.29 percent hydrogen, 7.49 percent nitrogen, and 8.56 percent sulfur.

Example 10

The sodium salt of m-fluorophenyl-penicillin represented by the formula

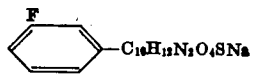

can be prepared in the following manner:
A culture medium may be prepared in the following proportions:

| | | |
|---|---|---|
| Lactose | g | 125 |
| Corn steep solids | g | 100 |
| Calcium carbonate | g | 10 |
| N-(2-hydroxyethyl)-m-fluorophenylacetamide | g | 0.78 |
| Water | cc | 5000 |

The sterile culture medium is inoculated with mold spores, and subsequent mold growth and isolation of m-fluorophenyl-penicillin is effected by substantially the same procedure as described in Example 7.

The dry amorphous sodium salt of m-fluorophenyl-penicillin may be recrystallized and purified by solution in 90 percent aqueous acetone followed by precipitation with absolute acetone.

A sample of the sodium salt of m-fluorophenyl-penicillin was found to possess a value of about 2340 Oxford units per milligram when tested against *Staph. aureus*, strain 209P. A differential assay carried out on *Staph. aureus*, strain 209P, and *B. subtilis*, strain N. R. R. L. B–558, gave a value of about 0.76. Analysis showed the presence of 51.47 percent carbon, 4.19 percent hydrogen, 7.61 percent nitrogen and 8.21 percent sulfur as compared with the calculated values of 51.33 percent carbon, 4.31 percent hydrogen, 7.49 percent nitrogen and 8.56 percent sulfur.

Example 11

The sodium salt of p-bromophenyl-penicillin represented by the formula

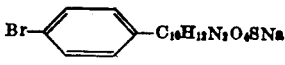

can be prepared in the following manner:
A culture medium is prepared in the following proportions:

| | | |
|---|---|---|
| Lactose | g | 125 |
| Corn steep solids | g | 100 |
| Calcium carbonate | g | 10 |
| N-γ-(p-bromophenyl)-butyryl-dl-valine | g | 1.2 |
| Water | cc | 5000 |

The culture medium is distributed in 200 cc. portions in 1 liter Erlenmeyer flasks, sterilized, inoculated with a spore suspension of Penicillium mold, strain N. R. R. L. 1976, and stoppered with cotton plugs. The flasks are maintained at a temperature of about 23-26° C. and shaken constantly for five days. The flask contents are then filtered to remove the mold mycelium, the filtrate cooled to about 0° C., acidified to about pH 2.2 with orthophosphoric acid and extracted with an equal volume of amyl acetate. The amyl acetate layer is separated and extracted with three 100 cc. portions of cold water to which cold N/10 sodium bicarbonate solution is added during the course of each extraction until a pH of about 7.1 to 7.3 is attained in the aqueous phase. The aqueous extracts are combined, cooled to about 0° C., acidified to about pH 2.2 with orthophosphoric acid and extracted with three 100 cc. portions of ether. The ether extracts are combined and are passed through a chromatographic type silica adsorption column about 30 mm. in diameter and 300 mm. long and containing a pH 6.2 phosphate buffer. The silica column is developed by percolation with six 100 cc. portions of ether containing successively increasing amounts of methanol in the order of ½, 1, 1½, 2, 2½ and 3 percent.

The developed silica column is divided into about 12 equal sections and each section is eluted with three 30 cc. portions of M/15 phosphate buffer of pH 7.0. The eluates are assayed bacteriologically to determine their penicillin content. 100 percent of the total antibiotic activity possessed by all the eluates originates in a single band in the silica column and arises from the presence of p-bromophenyl-penicillin. This band occupies a position slightly below that in which penicillin G is found in comparable columns. The eluates obtained from the silica gel sections which make up this uniform band are combined, cooled to about 0° C., acidified to about pH 2.2 and extracted with three 50 cc. portions of chloroform. The combined chloroform extracts are passed through a silica adsorption column similar to that used before. This silica gel column is developed by percolation with three 100 cc. portions of chloroform containing successively increasing amounts of methanol in the order of 1, 2 and 3 percent. The developed silica column is then divided into 12 equal sections and each section is eluted with three 30 cc. portions of M/15 phosphate buffer of pH 7.0. Bacteriological assay of the eluates shows that about 100 percent of the total antibiotic activity originates in a single band in the silica column. The eluates obtained by extraction of the silica column sections which comprise this band are combined, cooled to about 0° C., acidified to about pH 2.2 with orthophosphoric acid and extracted with three 100 cc. portions of ether. The ether extracts are combined and extracted with about 75 cc. of a cold dilute aqueous solution of sodium hydroxide to which N/10 sodium hydroxide solution is added during the course of the extraction so that a final pH of about 7.0 is obtained in the aqueous phase. From this aqueous solution the sodium salt of p-bromophenyl-penicillin may be separated by any suitable means, for example, by freezing and evaporation in vacuo from the frozen state.

The dry sodium salt of p-bromophenyl-penicillin is treated with 2 cc. of absolute acetone from which the crystalline salt separates after standing for about one hour. The salt may be recrystallized by treatment of a solution of the salt in 90 percent aqueous acetone with an excess of absolute acetone.

The sodium salt of p-bromophenyl-penicillin assayed about 2460 Oxford units per mg. when tested against Staph. aureus, strain 209P. A differential assay carried out on Staph. aureus, strain 209P, and B. subtilis, strain N. D. R. L. B-558, gave a value of about 0.65. Analysis showed the presence of 44.36 percent carbon, 3.93 percent hydrogen, 6.55 percent nitrogen and 16.81 percent bromine as compared with the calculated values of 44.14 percent carbon, 3.71 percent hydrogen, 6.05 percent nitrogen and 17.25 percent bromine.

*Example 12*

The sodium salt of p-bromophenyl-penicillin can also be prepared in the following manner:

A culture medium is prepared in the following proportions:

| | | |
|---|---|---|
| Lactose | g | 125 |
| Corn steep solids | g | 150 |
| Calcium carbonate | g | 25 |
| β-p-Bromophenethanol | g | 1.0 |
| Water | cc | 5000 |

The sterile culture medium is inoculated with mold spores and mold growth and isolation and purification of p-bromophenyl-penicillin are carried out by substantially the same procedure as described in Example 11.

The sodium salt of p-bromophenyl-penicillin thus prepared is identical with p-bromophenyl-penicillin sodium salt prepared according to the procedure described in Example 11.

*Example 13*

The sodium salt of p-iodophenyl-penicillin represented by the formula

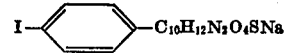

can be prepared in the following manner:

A culture medium is prepared in the following proportions:

| | | |
|---|---|---|
| Lactose | g | 125 |
| Corn steep solids | g | 100 |
| Calcium carbonate | g | 10 |
| N-(2-hydroxyethyl)-p-iodophenyl-acetamide | g | 1.2 |
| Water | cc | 5000 |

The culture medium is distributed in 200 cc. portions in 1 liter Erlenmeyer flasks, sterilized, inoculated with a spore suspension of Penicillium mold, strain X1612, and stoppered with cotton plugs. The flasks are maintained at a temperature of about 23-26° C. and shaken constantly for five days. The flask contents are then filtered to remove the mold mycelium. The p-iodophenyl-penicillin present in the filtrate may be isolated according to the procedure described in Example 7.

The dry amorphous sodium salt of p-iodophenyl-penicillin obtained by evaporation of the aqueous solution of the sodium salt from the frozen state assayed about 2770 Oxford units per milligram when tested against Staph. aureus, strain 209P. A differential assay carried out on Staph. aureus, strain 209P, and B. subtilis, strain N. R. R. L. B-558, gave a value of about 0.67.

*Example 14*

Other substituted-phenyl penicillins of our invention are prepared by the procedures of the foregoing examples, using precursors containing the substituted-phenyl radicals desired in the new penicillins. Thus the following new penicillins are prepared, using the precursors listed.

| New Penicillin | Precursors Which Produce the New Penicillins |
|---|---|
| m-chlorophenyl-penicillin | N-(2-hydroxyethyl)-m-chlorophenyl-acetamide |
| m-bromophenyl-penicillin | N-(2-hydroxyethyl)-m-bromophenyl-acetamide |
| m-iodophenyl-penicillin | N-(2-hydroxyethyl)-m-iodophenyl-acetamide |
| m-methylphenyl-penicillin | N-(2-hydroxyethyl)-m-methylphenyl-acetamide |
| o-methylphenyl-penicillin | N-(2-hydroxyethyl)-o-methylphenyl-acetamide |
| p-isopropylphenyl-penicillin | N-(2-hydroxyethyl)p-isopropyl-phenylacetamide |
| p-cyanophenyl-penicillin | p-cyanophenylacetyl-dl-valine |

Example 15

The new penicillins obtained in the form of their sodium salts can be converted to other salts in a number of ways. One way is as follows: An aqueous solution of the sodium salt, acidified to about pH 2, is extracted with an equal volume of an organic solvent, such as amyl acetate, ether, chloroform, or the like. The organic solvent solution, containing the new penicillin in acid form, is extracted with an aqueous solution containing the cation of the desired salt, for example, a solution of potassium hydroxide, calcium phosphate, ammonium hydroxide, or the like, at about pH 8.5. The aqueous extract contains the penicillin as the corresponding salt, for example, the potassium salt, the calcium salt, or the ammonium salt of the penicillin, and such salt is suitably recovered from the solution, as by drying in vacuo from the frozen state.

We claim as our invention:

1. A compound of the group consisting of a new penicillin acid and its sodium, potassium, calcium and ammonium salts, said acid being represented by the formula

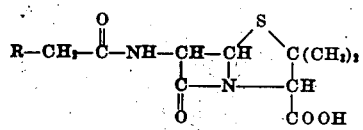

in which R is a mono-substituted phenyl radical of the group consisting of halophenyl, methylphenyl, cyanophenyl, and lower-aliphatic hydrocarbon-substituted phenyl in which the aliphatic substituent contains from 1 to 3 carbon atoms.

2. A new penicillin represented by the formula

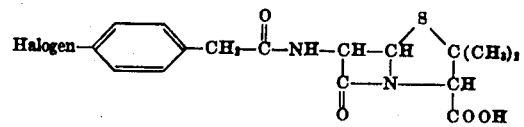

3. A new penicillin represented by the formula

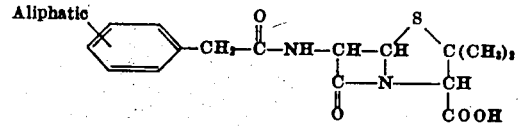

4. p-Chlorophenyl-penicillin.
5. p-Bromophenyl-penicillin.
6. p-Iodophenyl-penicillin.
7. p-Methylphenyl-penicillin.
8. p-Nitrophenyl-penicillin.

OTTO K. BEHRENS.
REUBEN G. JONES.
QUENTIN F. SOPER.
JOSEPH W. CORSE.

REFERENCES CITED

The following references are of record in the file of this patent:

UNITED STATES PATENTS

| Number | Name | Date |
|---|---|---|
| 2,479,296 | Behrens | Aug. 16, 1949 |

OTHER REFERENCES

NRRL Report CMR–C–16, December 15, 1944, page 2.